US011252450B2

(12) United States Patent
Smith et al.

(10) Patent No.: US 11,252,450 B2
(45) Date of Patent: *Feb. 15, 2022

(54) VIDEO CLASSIFICATION USING USER BEHAVIOR FROM A NETWORK DIGITAL VIDEO RECORDER

(71) Applicant: ARRIS Enterprises LLC, Suwanee, GA (US)

(72) Inventors: Alfonso Martinez Smith, Algonquin, IL (US); Benedito J. Fonseca, Jr., Glen Ellyn, IL (US); Faisal Ishtiaq, Chicago, IL (US); Andrew Aftelak, Palatine, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,430

(22) Filed: Oct. 5, 2020

(65) Prior Publication Data

US 2021/0021885 A1 Jan. 21, 2021

Related U.S. Application Data

(63) Continuation of application No. 14/750,261, filed on Jun. 25, 2015, now Pat. No. 10,834,436.
(Continued)

(51) Int. Cl.
*G06F 3/0481* (2013.01)
*H04N 21/234* (2011.01)
(Continued)

(52) U.S. Cl.
CPC ..... *H04N 21/23424* (2013.01); *H04N 21/233* (2013.01); *H04N 21/235* (2013.01);
(Continued)

(58) Field of Classification Search
None
See application file for complete search history.

(56) References Cited

U.S. PATENT DOCUMENTS

| 7,646,818 B2 * | 1/2010 | Chiu | G11B 27/28 375/240.25 |
|---|---|---|---|
| 8,752,115 B2 | 6/2014 | Dow et al. | |

(Continued)

FOREIGN PATENT DOCUMENTS

| EP | 1659795 A2 | 5/2006 |
| WO | 2014032708 A1 | 3/2014 |
| WO | 2015/038749 A1 | 3/2015 |

OTHER PUBLICATIONS

Z. Liu, et al., "Audio Feature Extraction and Analysis for Scene Segmentation and Classification", Journal of VLSI Signal Processing Systems for Signal, Image, and Video Technology, Kluwer Academic Publishers, vol. 20, Issue 1-2, pp. 61-79, 1998.
(Continued)

*Primary Examiner* — Nasser M Goodarzi
*Assistant Examiner* — Terrika Peterson
(74) *Attorney, Agent, or Firm* — Chernoff, Vilhauer, McClung & Stenzel, LLP

(57) ABSTRACT

Particular embodiments provide a system to determine ad segments in a video asset to enable subsequent ad replacement in video programs. The system is included in a multiple service operator (MSO) system that broadcasts video programs via a broadcast schedule. The MSO may not know the location of the ad segments in the video asset. To determine the ad segments, the MSO uses a classifier to classify video program segments and advertisements in the video asset. The classifier may be integrated with an nDVR system. By integrating with the nDVR system, particular embodiments may determine user behavior information, such as trick play commands, from the nDVR system. The classifier may use
(Continued)

the user behavior information to detect ad segments in the video asset. In one embodiment, the classifier may fuse outputs from different detectors to detect and validate ad segments in the video program.

20 Claims, 10 Drawing Sheets

Related U.S. Application Data

(60) Provisional application No. 62/167,084, filed on May 27, 2015.

(51) Int. Cl.
| | | |
|---|---|---|
| *H04N 21/25* | (2011.01) | |
| *H04N 21/81* | (2011.01) | |
| *H04N 21/235* | (2011.01) | |
| *H04N 21/472* | (2011.01) | |
| *H04N 21/466* | (2011.01) | |
| *H04N 21/845* | (2011.01) | |
| *H04N 21/233* | (2011.01) | |
| *H04N 5/14* | (2006.01) | |

(52) U.S. Cl.
CPC ..... *H04N 21/23418* (2013.01); *H04N 21/251* (2013.01); *H04N 21/4667* (2013.01); *H04N 21/47208* (2013.01); *H04N 21/812* (2013.01); *H04N 21/8456* (2013.01)

(56) References Cited

U.S. PATENT DOCUMENTS

| | | | | |
|---|---|---|---|---|
| 9,307,148 | B1* | 4/2016 | Baldwin | H04N 5/23267 |
| 2003/0093790 | A1* | 5/2003 | Logan | G11B 27/34 |
| | | | | 725/38 |
| 2003/0163816 | A1 | 8/2003 | Gutta et al. | |
| 2004/0045020 | A1* | 3/2004 | Witt | H04N 21/44004 |
| | | | | 725/13 |
| 2004/0261100 | A1* | 12/2004 | Huber | H04N 7/163 |
| | | | | 725/32 |
| 2005/0149965 | A1* | 7/2005 | Neogi | H04N 21/4755 |
| | | | | 725/14 |
| 2005/0149968 | A1* | 7/2005 | Konig | H04N 21/41415 |
| | | | | 725/32 |
| 2006/0020961 | A1* | 1/2006 | Chiu | H04N 5/76 |
| | | | | 725/32 |
| 2007/0107015 | A1* | 5/2007 | Kazama | H04N 21/482 |
| | | | | 725/58 |
| 2007/0134631 | A1* | 6/2007 | Hardy | G09B 7/02 |
| | | | | 434/236 |
| 2009/0077579 | A1* | 3/2009 | Li | H04N 21/44222 |
| | | | | 725/34 |
| 2011/0040760 | A1* | 2/2011 | Fleischman | G06F 3/048 |
| | | | | 707/737 |
| 2012/0023522 | A1 | 1/2012 | Anderson et al. | |
| 2012/0304223 | A1 | 11/2012 | Sargent et al. | |
| 2013/0014137 | A1 | 1/2013 | Bhatia et al. | |
| 2013/0205315 | A1 | 8/2013 | Sinha et al. | |
| 2013/0205317 | A1 | 8/2013 | Sinha et al. | |
| 2013/0325869 | A1* | 12/2013 | Reiley | G06F 16/41 |
| | | | | 707/741 |
| 2014/0282795 | A1* | 9/2014 | Kummer | H04N 21/44004 |
| | | | | 725/116 |
| 2016/0353139 | A1* | 12/2016 | Smith | H04N 21/47208 |

OTHER PUBLICATIONS

PCT Search Report & Written Opinion, Re: Application No. PCT/US2016/023051, dated Jun. 1, 2016.

* cited by examiner

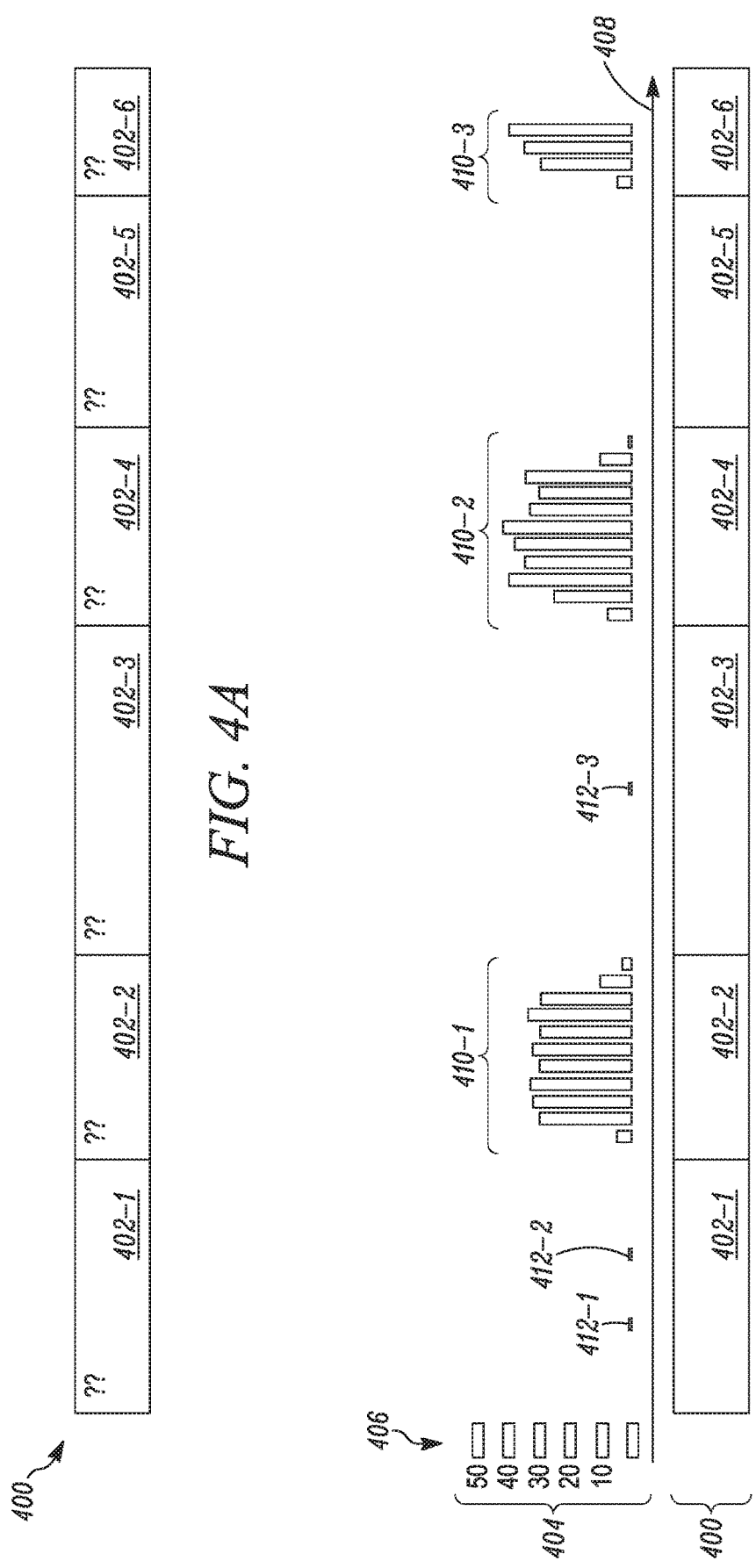

VIDEO CLASSIFICATION USING USER BEHAVIOR FROM A NETWORK DIGITAL VIDEO RECORDER

CROSS-REFERENCES TO RELATED APPLICATIONS

The present application is a continuation of U.S. patent application Ser. No. 14/750,261 filed Jun. 25, 2015, which claims priority to U.S. Provisional App. No. 62/167,084, filed May 27, 2015, the contents of which is incorporated herein by reference in its entirety.

BACKGROUND

A multiple service operator (MSO) may air a video asset, which may include a video program and advertisements within the video program. The video asset is encoded with the video program and advertisements. The MSO then delivers the encoded version to customer premise equipment (CPEs) for users. At a later time, the MSO may want to air the video program again. In one example, the MSO may air the video program with the same advertisements. In this case, the MSO sends the same encoding with the same video program and advertisements in the subsequent airings.

The subsequent airings may air at different times, such as the same night, or multiple days, weeks, and months, after the initial airing. In some cases, the MSO may want to replace the advertisements in the subsequent airings. This would allow the MSO to sell more advertising in the subsequent airings. However, to insert different advertisements in the subsequent airings, the MSO must know the location of the ad segments that include the advertisements in the video asset. In some cases the MSO does not know the exact location of most of the ad segments because the MSO delivers the video program to the users, but may not be the content source. Thus, the MSO must determine itself where the ad boundaries are and if needed, insert ad markers as appropriate for future uses of the same content.

BRIEF DESCRIPTION OF THE DRAWINGS

FIG. 4A shows an example of a video asset according to one embodiment.

FIG. 4B shows an example of correlating user behavior information with video segment information according to one embodiment.

DETAILED DESCRIPTION

Figure 1:
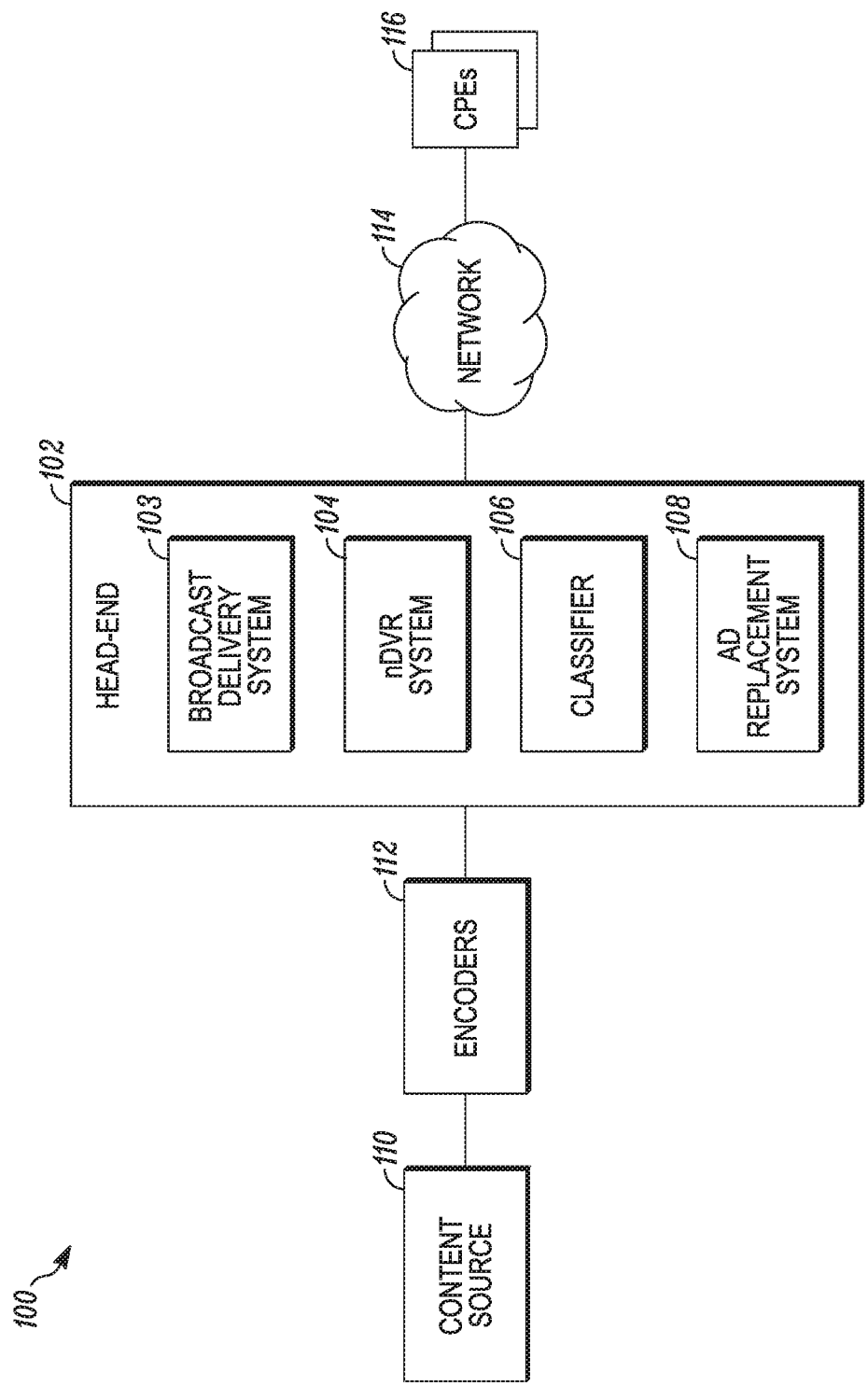
FIG. 1 depicts a simplified system for integrating an nDVR system with an ad replacement system using a classifier according to one embodiment.

Described herein are techniques for an advertisement (ad) replacement system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a system to determine ad segments in a video asset to enable subsequent ad replacement in video programs. A video asset may be referred to as including a video program and advertisements. In some cases, when video program is referred to, this may include both the video program and the included advertisements. Typically, the video program includes many ad segments in which advertisements are inserted in between video program segments. One example of a video asset may be a television show with advertisements inserted in the television show.

In one embodiment, the system is included in a multiple service operator (MSO) system that broadcasts video programs via a broadcast schedule. The MSO receives the video asset from content sources, where the video asset includes an encoded video program with advertisements. In some instances, the MSO may not receive locations of the ad segments in the video asset from the content source (e.g., in those cases where markers, such as Society of Cable Telecommunications Engineers (SCTE)-35 markers, are absent). To determine the ad segments (and potentially to insert markers, such as SCTE-35 markers, where appropriate for future use), the MSO uses a classifier to classify video program segments and advertisements in the video asset.

The classifier may be integrated with an nDVR system. The nDVR system provides a network-based personal DVR system for multiple users. The nDVR system is different from a local DVR system at a user's residence because the MSO maintains the recordings of the video programs on its system in the network, and not locally at a user's residence. By integrating with the nDVR system, particular embodiments may determine user behavior information, such as trick play commands, from the nDVR system. The classifier may use the user behavior information to assist detection of ad segments in the video asset.

In one embodiment, the classifier may fuse outputs from different detectors to detect and validate ad segments in the video program. For example, the classifier may include an ad detector that analyzes audio, video, and/or text (AVT) features to determine segments in the video content. This may provide a baseline detection of when segments may occur in the video program. Also, a user behavior detector may analyze user behavior (e.g., trick play commands) that may indicate an advertisement is occurring in the video program. For example, users may typically fast-forward during advertisements when viewing the video program on the nDVR system. Likewise, users may rewind at the tail end of an advertisement block when overshooting the video program start while using the fast-forward operation.

The classifier may use different combinations of the ad detection and user behavior information to detect ad segments. In a first example, only the user behavior information is used to detect ad segments. In this case, when a number of users fast forward during a time period above a threshold, the classifier may increase the probability that this segment is an ad segment. Using the user behavior information may not always be valid, however. For example, many users may fast-forward through a video program segment that is of low interest or low popularity even though this video segment is not an advertisement. To make sure that user behavior information does not cause the classifier to classify some video program segments as ad segments (e.g., false positives), a content similarity detector may analyze the content before and after a period where user behavior information indicates an ad segment is located. This may allow the classifier to confirm whether or not a detected ad segment is valid or not.

In a second example, the ad detector and user behavior detector output may be used. In this case, the ad detector may detect sentinel frames to determine ad boundaries. However, the ad detector may not be able to classify the segments that are detected. The user behavior information may then be used to confirm which segments are ad segments by analyzing fast forward behavior, such as segments that include a number of users that fast forwarded above a threshold indicates a segment is an ad segment. The content similarity analysis may also be used to detect false positives again. For example, a low interest segment may include a transition that may be detected as an ad boundary. This segment may include a lot of fast forward commands, but this segment should not be classified as an ad segment.

System Overview

FIG. 1 depicts a simplified system 100 for integrating an nDVR system 104 with an ad replacement system 108 using a classifier 106 according to one embodiment. System 100 may broadcast video assets in a linear manner using a broadcast schedule. For example, a head-end 102 includes a broadcast delivery system 103, which may be a cable television system, that can broadcast video assets via a set schedule over a network 114 to customer premise equipment (CPE) 116.

In one embodiment, a content source 110 is an owner of a video asset. Content source 110 may be a separate entity from the MSO. That is, the content sources provide the video assets to the MSO, which then delivers the video assets to users. One example of content sources may be different cable television networks. Head-end 102 may receive video assets from many different content sources 110.

Encoders 112 encode the video program and advertisements into an encoded video stream. The MSO then receives the encoded video stream at head-end 102, and broadcast delivery system 103 can deliver the video asset at its scheduled time. In one example, content sources 110 encode the video asset with the video program and advertisements before delivering the encoded video stream to the MSO for delivery.

A network digital video recorder (nDVR) system 104 may provide a network-based DVR for users of CPEs 116. nDVR system 104 is coupled to broadcast delivery system 103 to record the video broadcasts for the video assets. Once recorded, users can access the recordings of the video program in nDVR system 104. Due to using the nDVR system 104, the MSO can determine when users of CPEs 116 request video programs via the nDVR system 104 after the initial broadcast. Further, during the viewing of those video programs, user behavior may be captured by nDVR system 104. For example, the user behavior may include trick play commands performed by the user to fast forward, rewind, and play the video asset.

The MSO may not know when all or a portion of the advertisements were inserted into the video asset. For example, the encoded video asset may include markers, such as SCTE markers to enable local ad replacement by the MSO. The local ad replacement allows the MSO to replace ads in different local markets. However, national advertisements do not include these markers. Further, content source 110 may insert sentinel frames into the video asset to delimit ad segments, but these frames need to be detected or may not always be inserted. The sentinel frames may include station logos, black frames, a station identifier frame commonly used to identify the television station in which the video is broadcast, or other information (e.g., metadata) that are used to transition to ads from the video program.

To determine where the ad segments occur in the video program, a classifier 106 is integrated with the broadcast delivery system 103 and nDVR system 104 to determine ad segments in the video asset. Classifier 106 may include multiple detectors that detect different information from the video asset or nDVR system 104. In one embodiment, classifier 106 includes an ad detector, a user behavior detector, a content similarity detector, and a fusion module.

The ad detector may analyze video content of the video asset to determine segments in the video asset. For example, the ad detector may search for black frames occurring in periods of silence or low audio energy in the video program. As another example, the ad detector detects ad markers, such as SCTE ad boundary markers for local ad replacement. However, not all of the ad boundaries may be detected using SCTE markers. Also, sentinel frames may be detected by the ad detector. Although these frames can be used to detect the transition between segments, they may not indicate whether the transition is from an ad segment to a video program segment, from an ad segment to another ad segment, or from a video program segment to an ad segment.

The user behavior detector detects user behavior from multiple users using nDVR system 104 to play the video asset. The user behavior may be used to validate whether detected ad segments are correct or to determine new ad segments. For example, users may fast forward past advertisements in the video asset.

The content similarity detector detects content around boundaries and performs a content similarity analysis. As will be described in more detail below, the user behavior information may not always identify ad segments correctly (such as when only fast forward information is used or users fast forward past low interest segments in the video program and not the advertisements). The content similarity analysis validates boundaries based on content similarity analysis around certain boundaries that are identified based on the ad content analysis or user behavior. For example, an ad boundary should have content before the boundary that is not very similar to the content after the ad boundary due to the video program being different from the ad.

A fusion module may then fuse the detected features to determine ad segments in the video program. Because the MSO may not know where all the ad segments are in the encoded video stream for the video asset, classifier 106 may use multiple combinations of features to detect the ad segments. For example, information from the ad detector, user behavior detector, and content similarity detector may be used to output a set of ad boundaries for the video asset. In some embodiments, not all of the detectors may be used, such as only the user behavior detector and content similarity detector are used, or the ad detector and user behavior detector are used. In other embodiments, all three detectors may be used. Throughout the whole video asset, there may be segments that only the ad detector detects, or segments where only a large number of users fast forwarded, or where both the ad detector and user behavior detect segments. Fusion module may analyze all different combinations throughout the video asset to determine the ad boundaries in the video asset.

Once determining the ad segments, an ad replacement system 108 can then replace the advertisements in the video asset using the locations of the ad segments are known. The ad replacement is performed based on boundaries determined by classifier 106. This ad replacement may be performed at a later time after the initial broadcast of the video asset. The collection of user behavior information may require waiting for a certain number of users to access the stored video asset on nDVR system 104 for the user behavior information to be accurate. Because the MSO may not want or be allowed by the content creator to replace ads in the video asset for a number of days or months, this delay may be acceptable.

nDVR System

Figure 2:
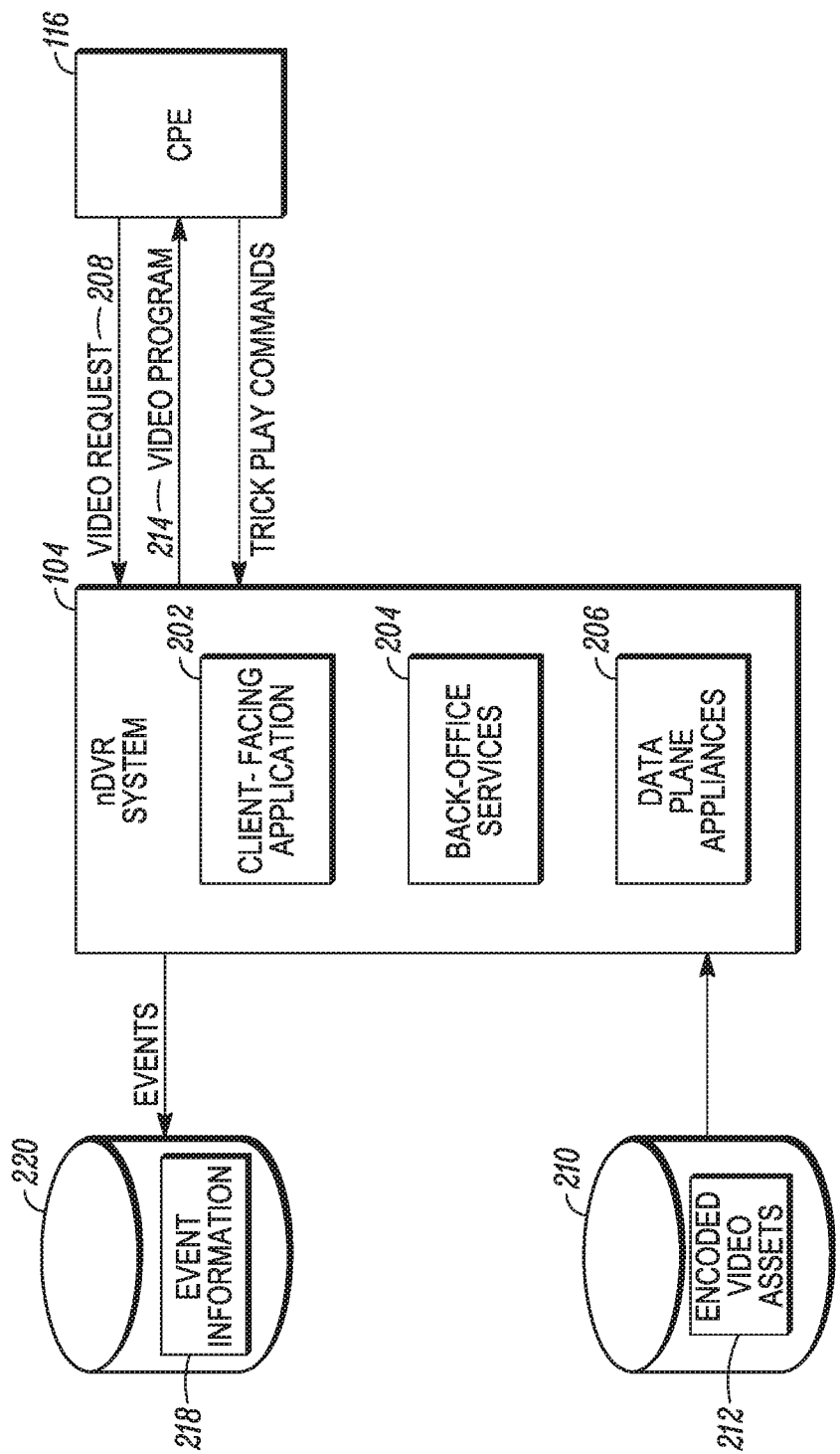
FIG. 2 depicts a more detailed example of nDVR system according to one embodiment.

As mentioned above, an nDVR system 104 is used to allow users to request recorded video programs that have been broadcast at a different scheduled time. FIG. 2 depicts a more detailed example of nDVR system 104 according to one embodiment. nDVR system 104 includes a client application 202, back-office services 204, and data plane appliances 206. These components may be instrumented to provide the required information to classifier 106.

Client-facing application 202 may be a client- or user-facing application that captures user interactions with the video asset. For example, the interactions may include trick play behavior or other navigation and/or inputs with respect to the video asset. Client-facing application 202 is instrumented to provide events for the user behavior database 220.

Back-office services 204 may include various services related to implementing the nDVR system. For example, content guide (e.g., electronic program guide (EPG information), content recording (e.g., a scheduler), and content playback/fulfillment (FM) transactions are performed by back-office services 204. Back office services 204 may schedule and record the video assets for multiple users in personal virtual storage space for each user. The content guide information determines when video programs are broadcast via the broadcast schedule. The content recording service may record content when it is broadcast by broadcast delivery system 103. Content playback/fulfillment transaction services may fulfill the video requests from CPEs 116. Back-office services 204 also provide events to database 220.

Data plane appliances 206 provide physical recording statistics and the physical delivery information from video assets recorded and delivered to users. These events are also sent to database 220.

Database 220 stores the aggregated information from client-facing application 202, back office services 204, and data plane appliances 206 as event information 218. Classifier 106 can access this information to analyze the video asset for ad segments.

In the general operation of nDVR system 104, as shown at 208, CPE 116 has sent a video request to nDVR system 104. Client-facing application 202 receives the video request. Back-office services 204 may have recorded the video asset, and then determines an encoded video asset for the video request. For example, storage 210 may record encoded video assets 212. In one embodiment, users include virtual DVR storage in which encoded video assets 212 may be associated with the virtual DVR storage space.

Back-office services 204 may retrieve the encoded video asset 212 and send it to CPE 116 at 214. During playback, a user may perform trick play commands. Client-facing application 202 may process these commands. For example, client application 202 causes the fast-forward and rewind commands to be executed using back office services 204. These events may be stored in event information 218 in database 220. The event information may be aggregated for multiple users. That is, multiple users may request the same video asset. The events for the users may be aggregated in event information 218.

Classifier 106

Classifier 106 may be integrated with nDVR system 104 to classify segments of the video asset. Classifier 106 may be run continuously or multiple times to refine the ad segment detection. For example, the video asset may be broadcast during its broadcast schedule slot. At that point, trick play commands may not be recorded. However, once nDVR system 104 records the video asset, users may access the video asset using nDVR system 104. After a number of users over a threshold have accessed the video asset using nDVR system 104, enough user behavior information may be recorded such that the trick play information can be used to classify ad segments.

Figure 3:
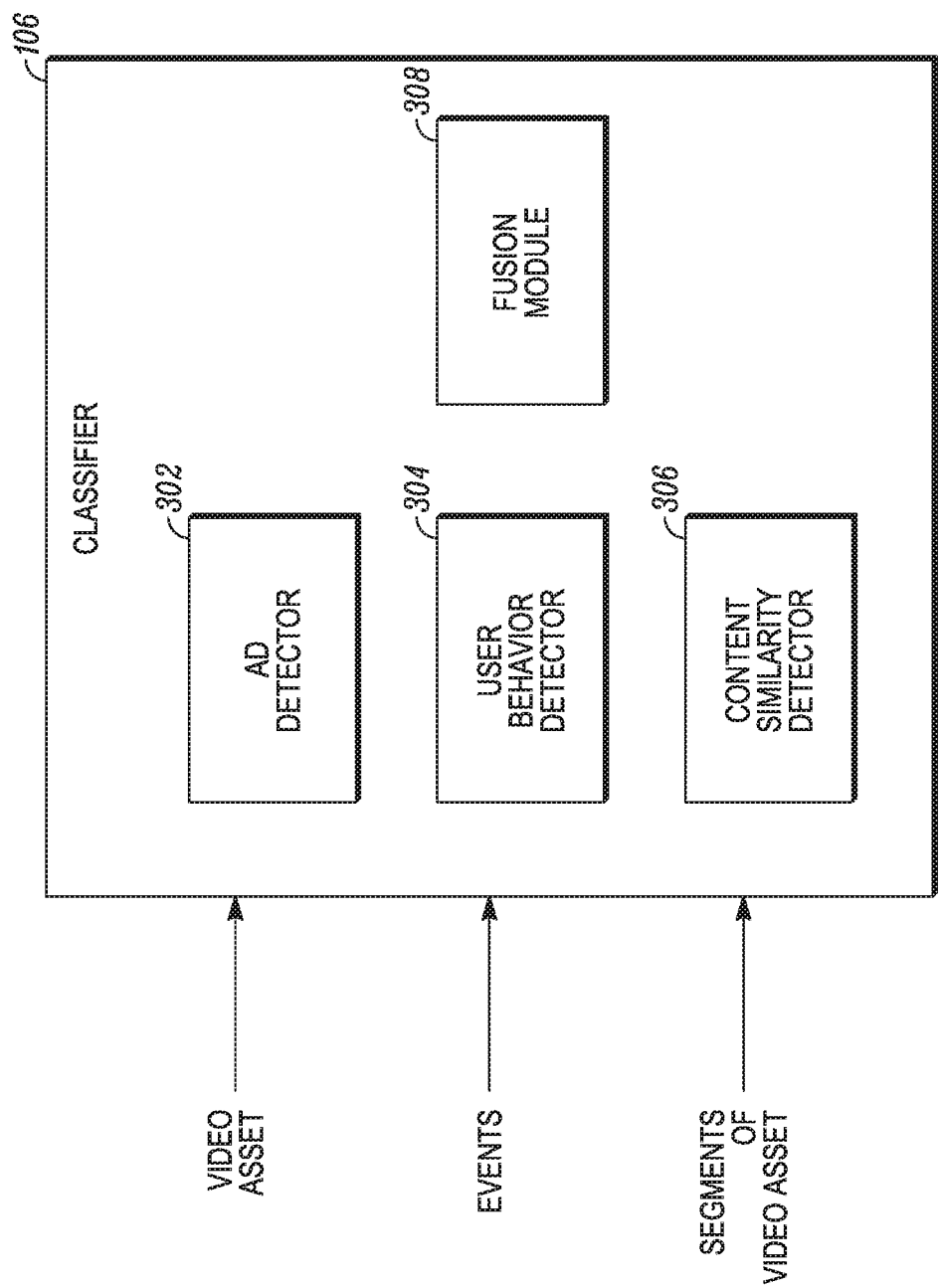
FIG. 3 depicts a more detailed example of the classifier according to one embodiment.

As discussed above, classifier 106 may include multiple detectors that analyze different features from the video asset. FIG. 3 depicts a more detailed example of classifier 106 according to one embodiment. For example, classifier 106 includes an ad detector 302, a user behavior detector 304, a content similarity detector 306, and a fusion module 308.

Ad detector 302 may receive audio, video, and/or text features from the video asset stored in storage 210. Ad detector 302 analyzes those features to determine segments in the video asset. For example, ad detector 302 may analyze the features to determine characteristics that may indicate an ad is being played in the video asset. These characteristics may include ad markers or sentinel frames. In a further embodiment, ad detector 302 may preliminarily classify which segments are video program segments and which segments are ad segments. This analysis may be based on different characteristics, such as the length of the segments, content of the segments, the markers, etc. In some cases, ad detector 302 may not be able to classify all segments. Also, ad detector 302 may classify segments with different confidence levels, such as an ad segment delimited by a sentinel frame is classified with a high confidence, but an ad segment detected using a single black frame during silent periods may be classified with a lower confidence. Ad detector 302 outputs the boundaries for the segments in the video asset, and also the preliminary classification if determined.

User behavior detector 304 may receive events based on the user interactions associated with nDVR system 104 from event information 218. As described above, the events may occur after the initial broadcast of the video asset, and the events are aggregated across many users. Analytics software may process and aggregate the events stored in stored 218. User behavior detector 304 may then analyze the aggregated event information over time, which is changing as multiple users access the video asset from nDVR system 104. User behavior detector 304 outputs aggregated user behavior information. For example, boundaries for segments in which user's performed a large amount of fast forwards may be output along with the fast forward levels (e.g., the amount of users that fast forwarded during the segment). In one example, if at least X users fast-forward within a period T1-T2, the likelihood that T1-T2 is an advertisement period increases; and if fewer than Y users fast-forward within a period T1-T2, the likelihood that T1-T2 is an advertisement period decreases. In one embodiment, the period T1-T2 is provided by ad detector 302, while in other embodiments, the user behavior detector 304 may output the boundary of T1 and T2 with a confidence level or probability. Other user behavior information may also be output, such as rewind behavior towards the end of an ad segment.

Content similarity detector 306 may detect content similarity across boundaries detected by user behavior detector 304 or ad detector 302. For example, false positives may result when only user behavior information is used. As described above, sometimes users may fast-forward during low-interest segments in the video program. Content similarity detector 306 may determine portions of the video asset to analyze based on boundaries from ad detector 302 and/or user behavior detector 304. Content similarity detector 306 may then analyze the content to validate whether a detected ad segment is valid or not. For example, content similarity detector 306 may determine a boundary for an advertisement that has been detected using ad detector 302 and/or user behavior detector 304. Content similarity detector 306 may determine content before the boundary and also after the boundary. If this is a correct ad boundary, the content for a time period before the ad boundary may be content from the video program and the content for a time period after the ad boundary may be content from an advertisement. Content similarity detector 306 may determine whether the features of the two time periods of content are similar or not. If the content is similar, then there is a lower probability that this boundary may be a valid ad boundary. Rather, this may be a video program segment of low interest. If the content is not very similar, then there is a higher probability that this boundary is a valid ad boundary (or lower probability the boundary is incorrect). Content similarity detector 306 outputs the results of this analysis, which may be confidence levels or probabilities the boundary is a correct ad boundary. In one embodiment, content similarity detector 306 is a separate component from ad detector 302. In other embodiments, the function of the content similarity detector 306 may be performed by ad detector 302; and the output of the content similarity analysis is incorporated in the output of ad detector 302.

Fusion module 308 receives the output from ad detector 302, user behavior detector 304, and content similarity detector 306. Fusion module 308 can then fuse the results to determine ad segments in the video asset. As discussed above, different combinations of outputs from ad detector 302, user behavior detector 304, and content similarity detector 306 may be used when analyzing an entire video asset. The fusing may consider results of all three detectors, or less than all three. For example, the boundaries determined by the ad detector 302 are correlated by the user behavior detected by user behavior detector 304. Then, the content analysis is used to confirm the segments again. In other embodiments, only the user behavior is used, and then these segments are confirmed by the content similarity analysis.

Fusion module 308 may determine which outputs to use. In some cases, only the user behavior and content similarity analysis may be available for a boundary. In other cases, all three outputs may be available. In yet other cases, the ad detector and user behavior outputs may be used. Fusion module 308 may process all the boundaries output to determine a final set of ad boundaries in the video asset. Fusion module 308 may then output a set of ad boundaries for the ad segments.

The output of the fusion module 308 can be used to trigger actions. In some embodiments, the output of fusion Module 308 is used to trigger (e.g., activate) ad replacement system 108. The time periods classified by fusion Module 308 as ad segments would be used by the ad replacement system 108 to place new ads (e.g., replace the existing ads in the video program) for future viewers. In other embodiments, the output of fusion module 308 triggers a data analytics system that estimates the ratio of users that fast forward in a particular ad and the ratio of users that stop fast forwarding and rewind at a particular ad. Such information can be useful for advertisers.

The output of fusion module 308 can be used to trigger an action in ad replacement system 108 as follows: as soon as the beginning time T1 and the end time T2 of a segment is classified as an ad segment, fusion module 308 sends a message over a computer network to the ad replacement system 108, which replaces the video frames contained in between times T1 and T2 with new frames corresponding to a new advertisement segment. The new advertisement segment may have being previously stored inside the ad replacement system 108 and has a duration that would allow it to be placed between times T1 and T2.

The output of fusion module 308 can be used to trigger an action in a data analytics system as follows: as soon as the beginning time T1 and the end time T2 of a segment is classified as an ad segment, fusion module 308 sends a message over a computer network to the data analytics system. This message indicates that the period corresponds to an ad segment and indicates any user interaction during the time. The data analytics system uses the content between times T1 and T2 of the video asset to identify the particular ad from a collection of known ads. Once the ad is identified, the data analytics system stores the user interactions against the particular ad. The data analytics system uses techniques; such as, but not limited to, basic statistics, pattern recognition, and machine learning, to analyze the aggregate user interaction information for the particular ad.

Examples of Classifying Video Assets

Before discussing the classification process by classifier 106 in more detail, different examples for detecting ad segments will be described.

FIG. 4A shows an example of a video asset 400 according to one embodiment. A portion of video asset 400 may include multiple segments 402-1-402-6. Each segment 402 may include multiple frames of video.

As noted in FIG. 4A with "??" symbols, the identification of ad segments may not be known. For example, ad detector 302 may analyze the encoded video to segment the video asset into segments 402. For discussion purposes, it is assumed that segments 402 have not been identified as video program segments or advertisement segments. However, ad detector 302 may segment the video asset and also attempt to classify segments 402 as ad segments or video program segments.

The user behavior information may then be correlated with the segment information. FIG. 4B shows an example of correlating user behavior information with video segment information according to one embodiment. At 404, user behavior information is shown corresponding to the segments that were shown at 400 in FIG. 4A. User behavior information at 404 quantifies a number of users shown at 406 on the Y axis. It should be noted the number of users may be multiplied by any factor (by 100, 1000, 10,000, etc.).

Figure 4C:
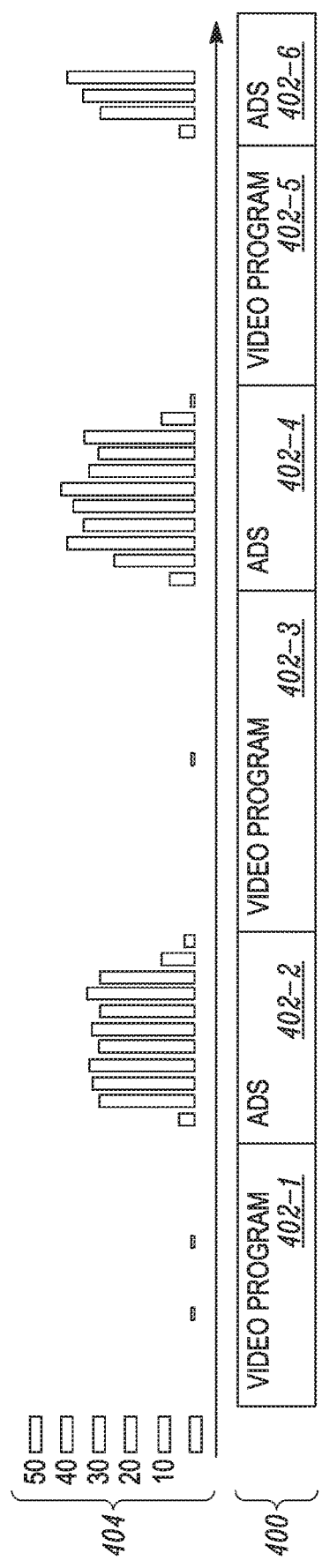
FIG. 4C shows the conceptual result of classifying segments of the video asset.

At 408, a timeline on the X axis corresponds to time in the video asset. The bars in the graph show the number of users that performed a fast-forward command during the playing of the video asset. At 410-1, 410-2, and 410-3, segments of times are shown where multiple users performed fast-forward commands. As can be seen, the segments of fast-forward commands correspond roughly to segments 402-2, 402-4, and 402-6 in the video asset. In this case, the fast-forward information may be used to validate or infer that segments 402-2, 402-4, and 402-6 may be ad segments. This is inferred due to the presumption that a large number of users may fast-forward past advertisements when using an nDVR system. There may be other instances where fast-forwards occur during the video, but with much fewer users than shown in sections 410. For example, in sections 412-1-412-3, very few users fast-forwarded during this time period. In this case, it may be determined that this fast-forward information is not enough to indicate that the corresponding portion of the video is an ad segment FIG. 4C shows the conceptual result of classifying segments 402 of the video asset. As shown in the video asset at 400, segments 402-1, 402-3, and 402-5 have been determined to be video program segments. Segments 402-2, 402-4, and 402-6 have been determined to be ad segments.

It should be noted in the above example, that the ad segments may be determined solely by the fast forward behavior and not by content analysis.

Figure 5A:
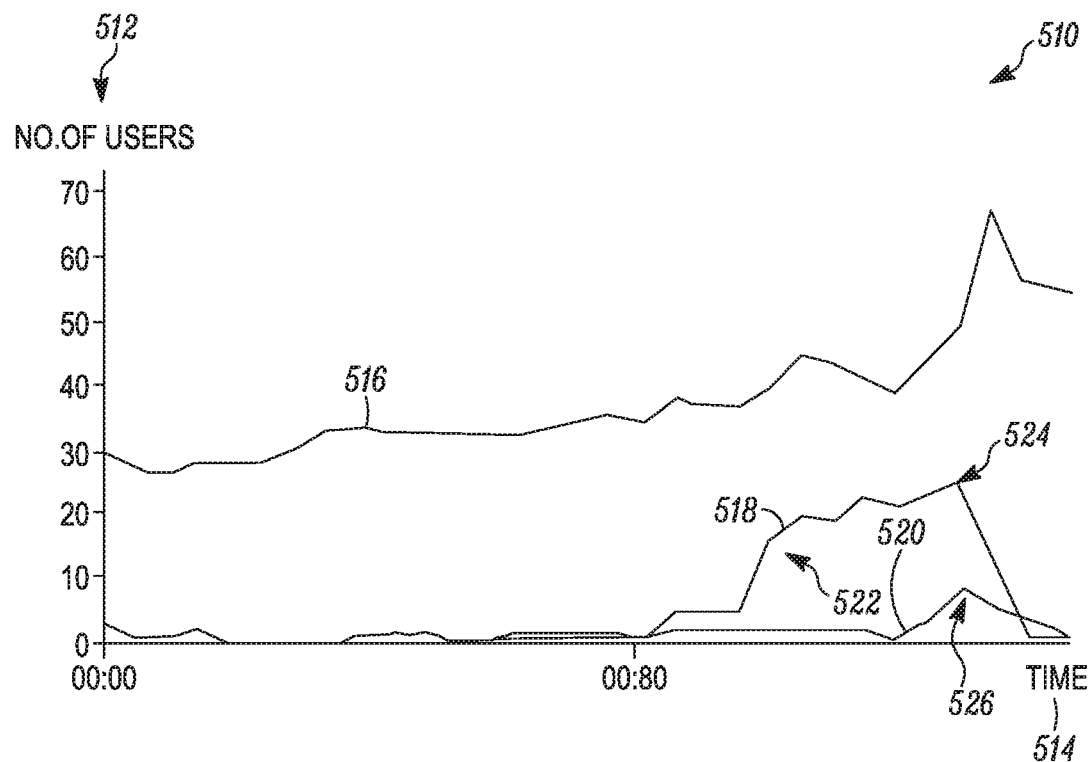
FIGS. 5A and 5B show an example where the detection of ad segments is confirmed according to one embodiment.
Figure 5B:
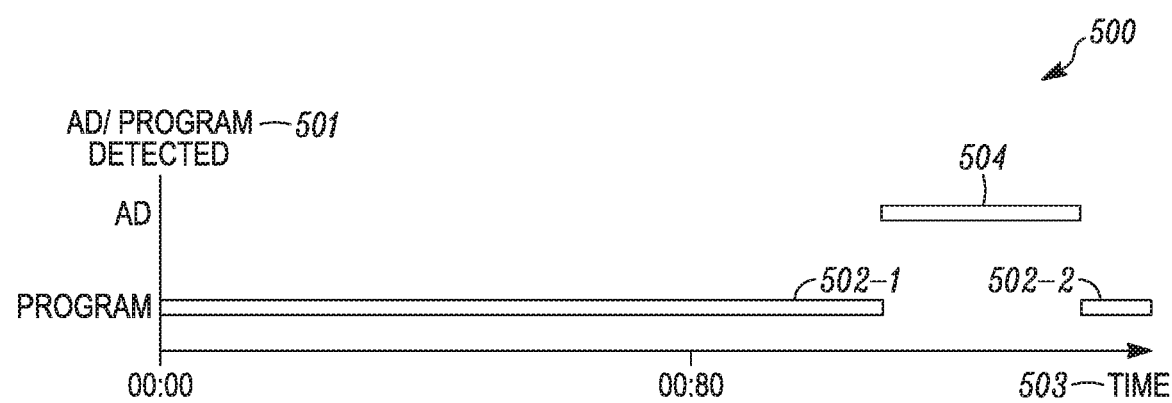

In addition to fast forward behavior, particular embodiments may use other trick play behavior. The following examples show the use of the trick play usage in more detail. FIGS. 5A and 5B show an example where the detection of ad segments is confirmed according to one embodiment. In FIG. 5B, a graph 500 shows where program segments and ad segments are detected using content analysis. In graph 500, the Y axis at 501 indicates whether or not a program or an ad has been detected in the video asset. Also, at 503, time during the video asset is shown. At 502-1 and 502-2, program segments have been detected. At 504, an ad segment has been detected in the video asset.

In FIG. 5A, a graph 510 shows aggregated trick play usage for a number of users. The number of users is shown on a Y axis at 512 and the time in the video asset that corresponds to the time in the content analysis is shown at 514. Graph 510 includes lines for play 516, fast forward 518, and rewind 520 trick play user behavior. For example, play line 516 shows the number of users that have played the video asset is shown. Fast forward line 518 shows the number of users that have fast-forwarded at the video asset is shown, and rewind line 520 shows the number of users that have performed rewind commands for the video asset.

Particular embodiments may analyze the trick play usage to confirm if the ad segments that were detected are valid. For example, it is expected during an ad segment at 504 that the fast-forward usage may increase. At 522, this is confirmed as the number of users that fast-forwarded the video asset has increased. This continues for a large part of the ad segment 504. Then, at 524, the number of users that is using fast-forward commands declines towards the end of the ad segment. This may confirm the beginning and the end of the ad segment that was detected using content analysis. Also, towards the end of the ad segment, the users may stop fast-forwarding and then have to rewind slightly. At 526, towards the end of ad segment 504, the number of rewinds also increases. This may indicate that the users have possibly overshot the advertisement and rewound.

Figure 5C:
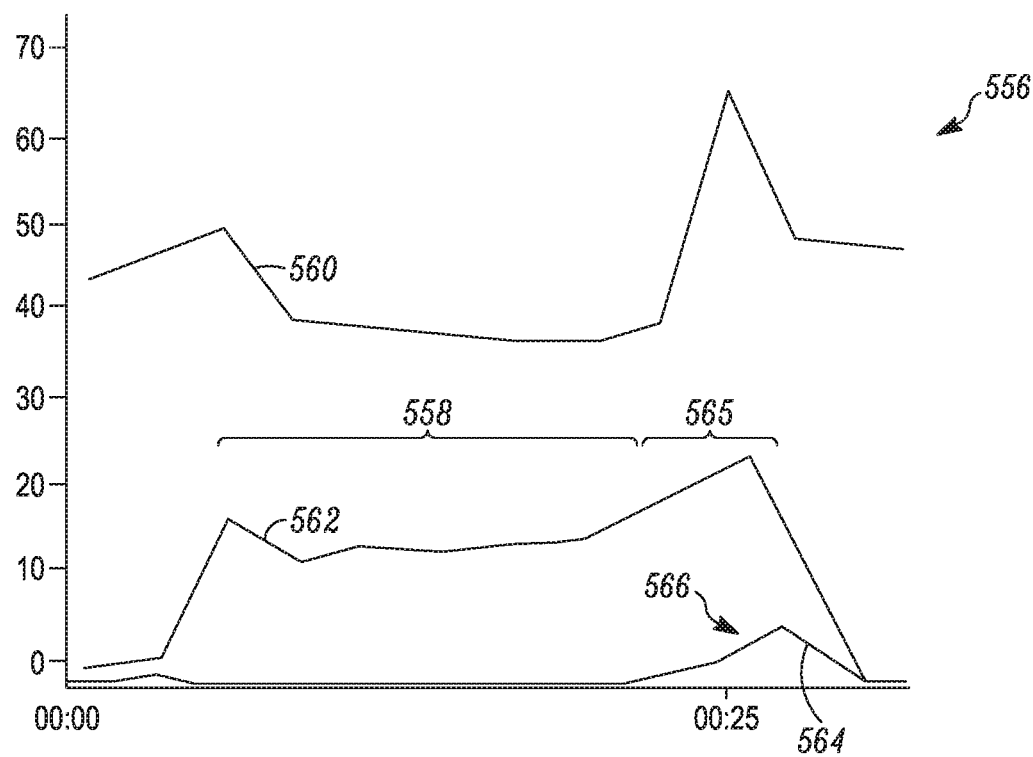
FIGS. 5C and 5D show an example where trick play usage may detect a false positive of an advertisement according to one embodiment.
Figure 5D:
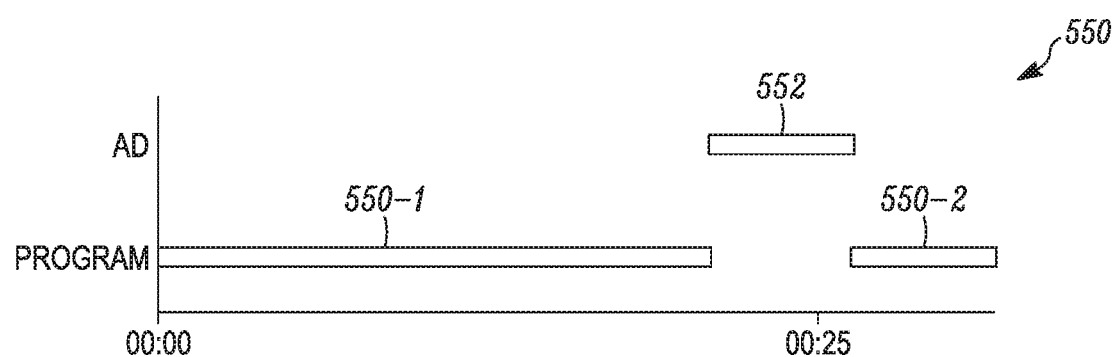

In the above case, the trick play usage confirms the detection of the ad segment 504. However, there may be ad segments that are detected that may not be ad segments. FIGS. 5C and 5D show an example where trick play usage may detect a false positive of an advertisement according to one embodiment. In FIG. 5D, a graph 550 shows program segments and ad segments. For example, a program segment 550-1 and a program segment 550-2 have been detected and an ad segment 552 has been detected using content analysis. In FIG. 5C, a graph 556 shows a play line 560, a fast-forward line 562, and a rewind line 564 for trick play usage. The trick play usage may correctly identify an ad segment again. For ad segment 552, there may still be a high number of users fast-forwarding as shown at 565 during ad segment 552. This may confirm that ad segment 552 is, in fact, an ad. Further, at 566, an increased number of rewind events occur which may confirm the presence of the advertisement as many users may have overshot the ad boundary.

However, the trick play usage may not always correctly identify ad segments. For example, at 558, fast-forward usage has increased. However, the fast-forward usage does not correspond completely with ad segment 552. For example, fast-forward usage has increased in video program segment 550-1. This segment, however, may not be an ad. Rather, during video program segment 550-1, a low-interest segment may be played, such as a viewer quiz may be rolling during the video program. However, a user may not be as interested in this type of content as with the regular video program. Thus, users have fast-forwarded during the time. Using only the fast forward behavior, a low-interest segment at 550-1 may be classified as an ad.

As described in the previous paragraph, if only the fast-forward usage is used to determine whether an ad segment occurs, then false positives may result. Further, other situations may occur when the content analysis may incorrectly identify an advertisement within a video program segment also. This may occur when the video program may include features that may be associated with advertisements. For example, low-interest segments may include features such as black frames that transition to the low-interest segment from the regular video program, and the content analysis may interpret these low interest segments as advertisement segments. Accordingly, particular embodiments provide the content similarity check to confirm whether or not the content analysis or user behavior detection is valid or not.

Overall Ad Segment Detection Process

Figure 6:
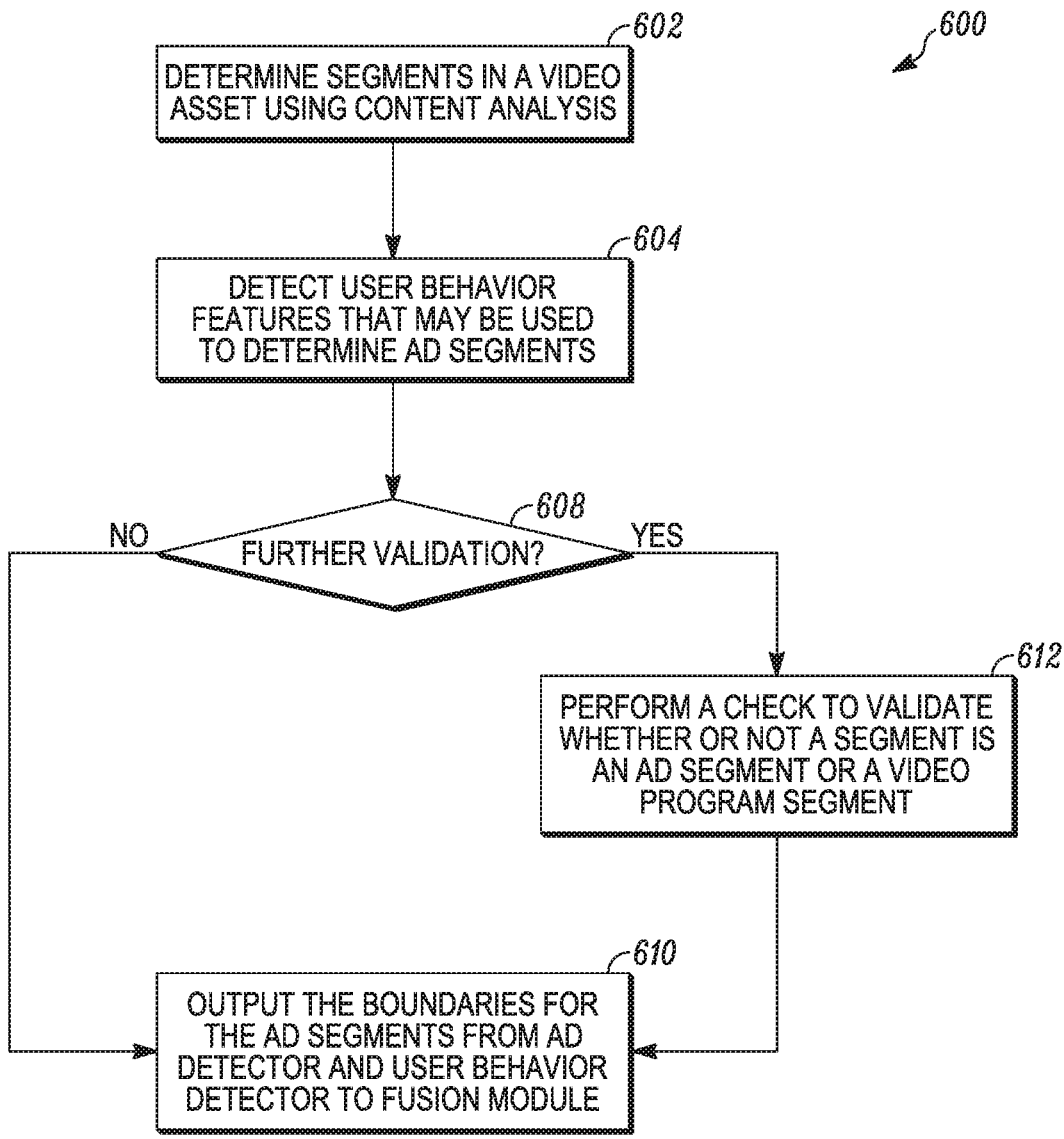
FIG. 6 depicts a simplified flowchart for performing the fusion of different features to determine ad segments according to one embodiment.

The following describes the process to detect ads using content analysis, validate the detected ads using user behavior information, and then validate the user behavior information using content similarity. FIG. 6 depicts a simplified flowchart 600 for performing the fusion of different features to determine ad segments according to one embodiment. At 602, ad detector 302 determines segments in a video asset using content analysis. The audio, video, and/or text features of the encoded video program may be analyzed to detect the segments. In some cases, ad detector 302 may determine whether segments are ad segments or video program segments.

At 604, user behavior detector 304 detects user behavior features that may be used to determine ad segments. For example, user behavior detector 304 may receive events for the trick play usage of nDVR system 104. User behavior detector 304 may compare the usage to thresholds to determine when user behavior shows certain characteristics, such as a number of users over a threshold have fast-forwarded during a block of time, which may indicate this block of time is an advertisement. Further, that block of time may be validated by a number of users over a threshold rewinding at the end of that block of time. User behavior detector 304 may output segments of user behavior that indicate segments in the video asset. For example, segments where fast forward usage was above a threshold are output. User behavior detector 304 may adjust its behavior based on information about the video program being aired. The threshold used to indicate segments in the video asset is adjusted based on this information. For example, video programs with lower popularity would use lower thresholds.

At 606, it is determined whether further validation of the ad segments is needed. In some embodiments, all boundaries may be checked using the similarity analysis. When used, to determine whether further validation is needed, a confidence score for the ad segments may be used. For example, some ad segments may be detected with high confidence scores using the content analysis or user behavior analysis. These ad segments may not need to be validated. However, ad segments with confidence scores below a threshold may need to be checked. Also, fast forward information may contradict the ad segments from the content analysis. If the check is not needed, then, at 608, the boundaries for the segments from ad detector 302 and user behavior detector 304 may be output to fusion module 308.

However, if a check is needed, at 610, content similarity detector 306 may then perform a check to validate whether or not a segment is an ad segment or a video program segment. This check may analyze the content before and after a boundary for an ad segment. After validation, content similarity detector 306 outputs the results to fusion module 308.

At 610, fusion module 308 can then use the results from ad detector 302, user behavior detector 304, and content similarity detector 306 to determine ad segments. For example, fusion module 308 may determine the segments from ad detector 302 are ad segments when a large amount of users performed fast-forwards. Then, fusion module 308 may decide to validate the ad segment with the content similarity analysis. In some cases, the content may not be similar and fusion module 308 determines the segment is indeed an ad segment. However, fusion module 308 may determine the result from the content similarity analysis indicates that the content is similar on both sides of the boundary, and thus this ad boundary is not valid; and fusion module 308 changes the classification of the segment to a video program segment. In another example, the results of ad detector 302 may not be available and only the user behavior information is used (or available), and fusion module 308 validates the boundary using the content similarity results.

Figure 7:
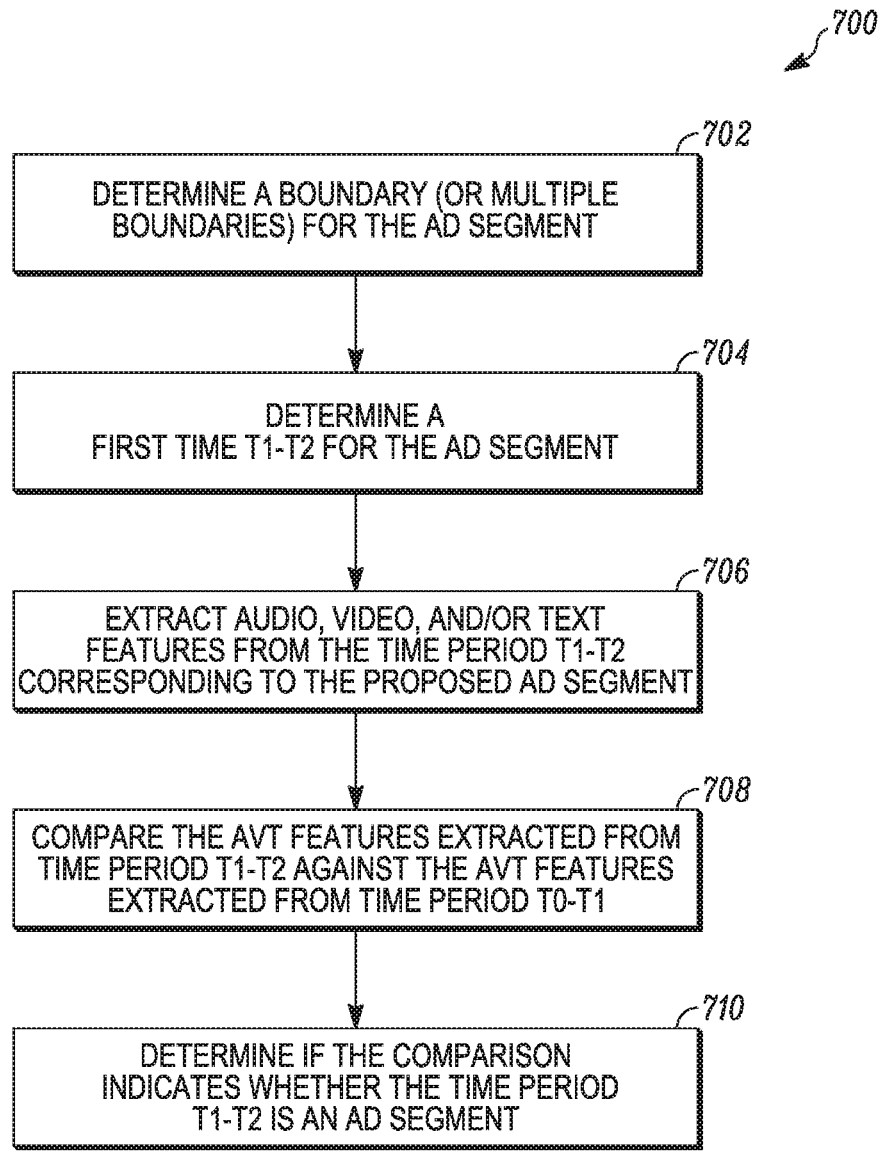
FIG. 7 describes a simplified flowchart of a method for performing the content similarity validation according to one embodiment.

The content similarity validation will now be described in more detail. FIG. 7 describes a simplified flowchart 700 of a method for performing the content similarity validation according to one embodiment. The content similarity validation is different from the ad detection content analysis because the content similarity validation only analyzes two discreet time periods before and after a boundary. Also, the content similarity analysis may be used to validate user behavior detection of ad segments. In some embodiments, the validation is used whenever fusion module 308 analyzes a video asset; in other embodiments, the validation is used when the initial ad detection by ad detector 302 is not run or available; and in further embodiments, the validation is used only when the initial ad detection is of a lower confidence score.

In the method, at 702, content similarity detector 306 determines a boundary (or multiple boundaries) for the ad segment. The boundary may be determined based on the content analysis and/or the user behavior analysis. In one example, the ad segment start time or end time is determined based on the content analysis. This may be where the content analysis detected sentinel frames or other transitions. In other embodiments, the boundary may be determined from the user behavior analysis. In this case, a segment of fast forward usage may have been used to determine the boundary. In other examples, both the content analysis and the user behavior may indicate the boundary for the ad segment, but one or both may have a low confidence score and the content similarity analysis is used to confirm the boundary. Further, the content analysis and the user behavior may provide multiple boundaries that need to be tested.

At 704, content similarity detector 306 determines a first time period T1-T2 for the ad segment. This time period may be from within the proposed ad segment, but may not include the whole ad segment.

At 706, content similarity detector 306 extracts audio, video, and/or text features from a time period within T1-T2 corresponding to the proposed ad segment. Audio, video, and/or text features closer to T1 or T2 may be discarded; for example, audio, video, and/or text features may be extracted only from X seconds after T1 up to Y seconds before T2 for some chosen X>0 and Y>0. Also, at 708, content similarity detector 306 extracts audio, video, and/or text features from the time period T0-T1, where T0<T1. The time period T0-T1 may be before the ad boundary inside a segment where very few or no users fast-forwarded between times T0-T1, or a number of users fast-forwarded below a threshold, which caused the segment to be preliminarily classified as a video program segment. Also, the time period T0-T1 may be before the ad boundary inside a segment where many users fast-forwarded between times T0-T1 or a number of users fast-forwarded above a threshold, which caused the segment to be preliminarily classified as an ad segment.

Different features for the video asset may be extracted. Examples of audio features may be 10-second statistics regarding a set of Mel Frequency Cepstral Co-efficient (MFCC) features, which represent a transformation of the frequency content of the audio signal at various points of the 10-second interval.

An example of a video feature may be 10-second statistics regarding color layout descriptors or edge histogram descriptors inside the time period. The color layout descriptors or edge histogram descriptors may describe the color layout or the edge layout in the encoded video asset. These descriptors may be retrieved from the encoded video program.

An example of a text feature may be the words, keyterms, or named entities inside the closed captions for the time period. The stem of words, keyterms, or named entities may be used to represent the whole word. For each word, keyterm, or named entity, an integer may be assigned to it.

In the examples above, the feature extraction results in a vector of real numbers. In one embodiment, each entry of a vector represents a mean of the feature vector along the period. For instance, in the case of the audio MFCC coefficients, a 24-dimensional vector is extracted over intervals, such as every 50 milliseconds. Around 2024 dimensional vectors will be extracted in a 10-second period between T0-T1. The final audio feature M01 may be the average of the 2024 dimensional vectors. Similarly, M12 during the time period T1-T2 may be the average of around 2024 dimensional vectors obtained in the 10-second period times T1-T2. In some embodiments, local sensitive hashing may be used and the color layout descriptor of each video frame within time period T0-T1 is hashed into an integer and the feature extracted from the time period T0-T1 represents a set of integers corresponding to the hashes of different frames inside the period. In other embodiments, the feature extracted from the time period T0-T1 represents the count of certain words, keyterms, or named entities inside the period.

The AVT features that are extracted between time period T0-T1 and time period T1-T2 may be based on context. For example, depending on the context of the video program, different features may be extracted. In one example, metadata for the video program may be used to determine which AVT features are extracted. For example, if an actor always appears in the video program, then AVT features for the actor are looked for. For instance, the statistics of MFCC coefficients extracted from a time period can be compared against statistics of MFCC coefficients normally present when the actor is speaking and if the statistics are similar, then a segment mistakenly classified as ad segment because of a high number of users fast forwarding in a low interest program segment would have its classification changed to a program segment. As another example, if the name of a person or a character that participates in the program appears in the text features extracted from a segment mistakenly classified as ad segment because of a high number of users fast forwarding in a low interest program segment would have its classification changed to a program segment.

Referring back to FIG. 7, at 708, content similarity detector 306 compares the AVT features extracted from time period T1-T2 against the AVT features extracted from time period T0-T1.

At 710, content similarity detector 306 determines if the comparison indicates whether the time period T1-T2 is an ad segment. For example, if the statistics extracted from time period T1-T2 are similar within a threshold to the statistics from time period T0-T1, then content similarity detector 306 may decrease the likelihood that time period T1-T2 is an ad segment or may determine that the segment between T1-T2 is a video program segment. The similarity metric used may depend on the type of feature. In one embodiment, the audio MFCC coefficients may use a similarity metric that is the inverse of an L2-norm the difference between the 24 dimensional vectors M01 and M12. In embodiments that use video frame hashes, the similarity metric can be computed as: for each hash integer of the time period T0-T1, particular embodiments find the closest hash integer in the time period T1-T2 and sum the square distance between the hashes. The inverse of this sum can be used as a similarity metric. For the text features, a similarity metric can be the inverse of the ratio of the important words present in time period T0-T1 that are present in time period T1-T2. Important words can be determined using the term frequency-inverse document frequency (TF-IDF) metric of each word that is computed based on the total number of words in the video asset for the term frequency component. The IDF component can be computed from a database of text from various other video assets. The higher TF-IDF values indicate important words.

Also, although not described above, an additional time period T2-T3, where T2 is less than T3 and time period T2-T3 is after time period T1-T2 may be used as described above. This may compare the content after the time period T1-T2. It is also assumed that in the time period T2-T3, the number of users who do not use fast-forward commands is under a threshold, and also rewind activity that has increased may also be taken into account. The use of time period T2-T3 may be used to confirm the boundaries of the ad segment or to confirm the correct length of the ad segment. As described above, different time periods may be used to adjust the boundaries for the ad or to generate various statistics that can be used to adjust the ad boundaries by fusion module 308.

Figure 8:
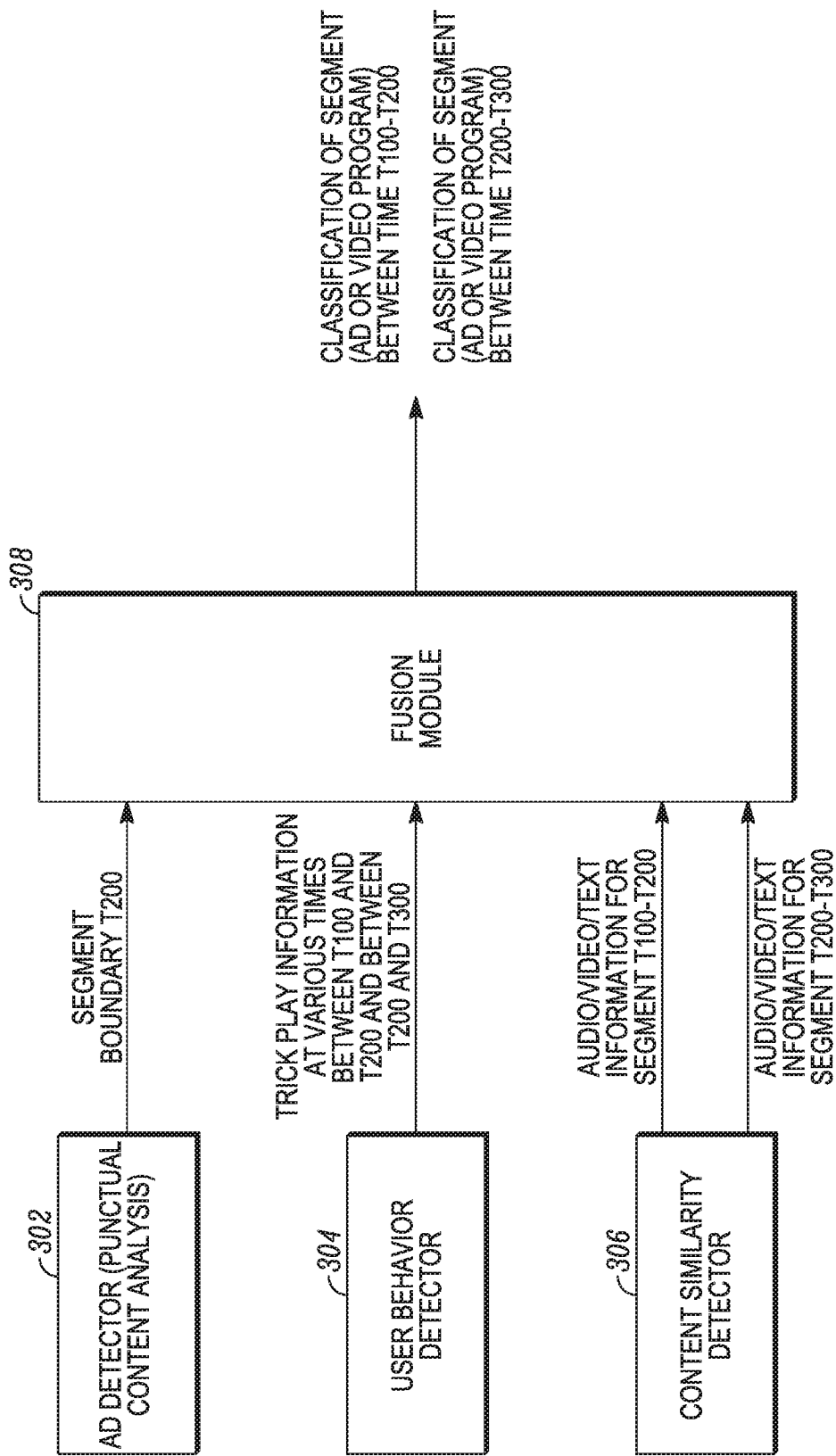
FIG. 8 shows a conceptual classification using the classifier according to one embodiment.

FIG. 8 illustrates how the information from the ad detector 302, from the user behavior detector 304, and from the content similarity detector 306 are used by the fusion module 308 to reach a final determination of segments separated by a boundary according to one embodiment.

As explained before, the ad detector 302 determines the various segments using content analysis. An example of such content analysis is to look for instances in which sentinel frames, such as black frames, are present in the video during periods of silence in the audio track; and when present, ad detector 302 would place a boundary in that point and form the various segments. Note that such determination of ad detector 302 is punctual in that the ad detector decides to place a boundary based on the analysis of the content at the point in time corresponding to the black frame.

As explained before, user behavior detector 304 provides the number of users that have fast forwarded or rewound at each instant of the video.

As explained before, content similarity detector 306 provides audio, video, and or text features for intervals of time. Note that the analysis of content similarity detector 306 is different than the analysis performed by ad detector 302 in several aspects: first, content similarity detector 306 performs content analysis at the segment level by extracting features from a large time interval, while ad detector 302 extract punctual features around a black frame; second, content similarity detector 306 performs comparisons between two segments, while ad detector 302 does not perform comparisons.

In one embodiment, fusion module 308 passes through each boundary that separates two consecutive segments in order to reach a final classification (video program segment or ad segment) for each of them. in this example, let a time period T100-T200 be the first segment and a time period T200-T300 be the second segment produced by ad detector 302 placing a boundary at time T200. Fusion module 308 then checks the number of fast forwards between the time period T100-T200 and the number of fast forwards between the time period T200-T300; and uses the audio, video, and text features corresponding to the interval T100-T200 and the audio, video, and text features corresponding to the interval T200-T300 to reach a decision whether the time period T100-T200 is an ad or a video program segment and whether the time period T200-T300 is an ad or a video program segment. In other embodiments, content similarity detector 306 provides a number indicating the level of similarity between the segments.

As an example of how fusion module 308 combines this information is as follows: segment T200-T300 is classified as an ad segment if the number of users that have fast forwarded during the time period T200-T300 is above a threshold and the information provided by the content similarity detector 306 indicates that the segments T100-T200 and T200-T300 are sufficiently different; otherwise; e.g., if the number of users that have fast forwarded in the segment T200-T300 is below a threshold or the information provided by content similarity detector 306 indicates that the segments T100-T200 and T200-T300 are similar, then the segment T200-T300 is classified as a video program segment. Similarly, segment T100-T200 is classified as an ad segment if the number of users that have fast forwarded during T100-T200 is above a threshold and the information provided by the content similarity detector 306 indicates that the segments T100-T200 and T200-T300 are sufficiently different; otherwise; e.g., if the number of users that have fast forwarded in the segment T100-T200 is below a threshold or the information provided by the content similarity detector 306 indicates that the segments T100-T200 and T200-T300 are similar, then the segment T100-T200 is classified as a video program segment.

In another embodiment, fusion module 308 uses the information from user behavior detector 304 and content similarity detector 306 to increase or reduce the likelihood of a video segment being an ad. The likelihood may be defined as a number between 0 and 1 that reflects the probability that a video segment is an ad. For instance, if the number of fast forwards in a video segment is high, fusion module 308 would increase the likelihood of the segment being an ad by a quantity that is increasing with the number of users that have fast forwarded in the segment. As another example, the content similarity analysis may output a content similarity number between 0 and 1 to indicate how similar the two consecutive segments are; and the fusion module 308 would decrease the likelihood of the segment being an ad by a quantity that is increasing with such content similarity number. As a further example, ad detector 302 may also provide likelihood values for each of the identified video segments. In all cases, fusion module 308 combines these likelihoods (for instance, by multiplying them) and reaches a final decision regarding the class of each video segment based on the combined likelihood of the segment being an ad. If the combined likelihood of a video segment is above a threshold; then fusion module 308 outputs that the video segment is an ad segment.

Other contexts may be used by fusion module 308 to determine ad segments. For example, fast-forwarded occurrences from multiple channels may be combined before making any decision regarding advertisement segments. In one example, there may be a strong correlation of ad slots across television shows that air at the same time on different channels. Primetime may be a good example of this. Also, overlapping fast-forward occurrences on multiple channels increases a confidence in the decision that the fast-forward usage correlates to an ad segment. In one example, this information may be used by looking at fast-forward information on a video asset #1 and making the inference on ad segments or program segments on asset #1. Then, the inferences may be correlated with fast-forward usage information for assets #2, #3, etc. that occur at the same time.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
broadcasting a video asset using a video broadcast system based on a broadcast schedule;
recording the video asset in a network digital video recorder (nDVR) system to allow users to request the video asset using the nDVR system on demand;
performing a content analysis of first audio, video, and/or text (AVT) features of the video asset to obtain a boundary that defines a first video segment and a second video segment;
performing a user behavior analysis of user behavior information received from user devices viewing the video asset using the nDVR system during the first video segment and the second video segment;
performing a content similarity analysis between second AVT features from the first video segment and third AVT features from the second video segment;
classifying the first video segment and the second video segment as either an ad segment or a video program segment based on the content analysis, the user behavior analysis, and the content similarity analysis; and
determining an action to be performed on the video asset based on the classifying of the first video segment and the second video segment.

2. The method of claim 1, wherein the action comprises triggering an ad replacement system to replace the first video segment or the second video segment with a new advertisement when the first video segment or the second video segment is classified as the ad segment.

3. The method of claim 1, wherein the action comprises triggering a data analytics system to analyze the first video segment or the second video segment to identify which advertisement is found in the first video segment or the second video segment when the first video segment or the second video segment is classified as the ad segment, wherein the data analytics system stores the user behavior information with respect to the identified advertisement.

4. The method of claim 1, wherein one of the first video segment and the second video segment is classified as the ad segment when a first number of users have fast forwarded during the first video segment or the second video segment above a first threshold and information provided by the content similarity analysis indicates that the first video segment is different from the second video segment by a second threshold.

5. The method of claim 4, wherein the one of the first video segment and the second video segment is classified as the ad segment when a second number of users have rewound during the first video segment or the second video segment below a third threshold.

6. The method of claim 1, wherein the user behavior analysis and the content similarity analysis are used to increase or reduce a probability of the first video segment or the second video segment being the ad segment.

7. The method of claim 1, wherein when using only the content analysis and the user behavior analysis, classifying the first video segment or the second video segment based on the content analysis determining the boundary and comparing a number of users having a same user behavior in the user behavior information to a threshold for the first video segment or the second video segment.

8. The method of claim 1, wherein the content analysis comprises:
analyzing the video asset for ad markers or frames that indicate ad transitions.

9. The method of claim 1, when using the content analysis and the user behavior analysis, the method further comprising:
determining whether the content similarity analysis should be performed to validate the classifying of the first video segment or the second video segment as the ad segment or the video program segment.

10. The method of claim 9, wherein the content similarity analysis is performed when a confidence score for the first video segment or the second video segment is below a threshold, the confidence score determined based on the content analysis and/or the user behavior analysis.

11. The method of claim 1, wherein comparing the second AVT features and the third AVT features using the content similarity analysis comprises:
generating a first feature vector for the second AVT features;
generating a second feature vector for the third AVT features; and
comparing the first feature vector and the second feature vector using a similarity function.

12. The method of claim 1, wherein an entity providing the video broadcast system does not receive a location of some ad segments in the video asset from a content source of the video asset.

13. A method comprising:
determining user behavior information from user devices viewing a video asset using a network digital video recorder (nDVR) system;
processing the user behavior information to determine a segment in the video asset, wherein a number of users above a threshold performed a same user behavior during the segment;
determining first audio, video, and/or text (AVT) features for a first time period outside of the segment and second AVT features for a second time period in the segment;
comparing the first AVT features and the second AVT features using a similarity analysis; and
classifying whether the segment is an ad segment or a video segment based on the similarity analysis and the user behavior information.

14. The method of claim 13, wherein processing the user behavior information comprises:
determining a boundary for the segment based on the number of users performing a same trick play command in the segment above the threshold.

15. The method of claim 14, wherein:
the number of users is a first number of users and the threshold is a first threshold, and
processing the user behavior information comprises determining the boundary when a second number of users performing the same trick play command outside of the segment is below a second threshold.

16. The method of claim 13, further comprising:
determining a set of segments in the video asset based on a content analysis of third AVT features of the video asset; and
using the user behavior information to classify the set of segments as ad segments or video program segments.

17. The method of claim 16, wherein the similarity analysis is not used to classify a segment in the set of segments when both the content analysis and the user behavior information are used.

18. The method of claim 16, further comprising:
determining when the similarity analysis needs to be performed, wherein the similarity analysis is performed when only the user behavior information is used and not content analysis to determine the segment in the video asset.

19. The method of claim 13, wherein comparing the first AVT features and the second AVT features using the similarity analysis comprises:
generating a first feature vector for the first AVT features;
generating a second feature vector for the second AVT features; and
comparing the first feature vector and the second feature vector using a similarity function.

20. A system comprising:
a video broadcast system configured to broadcast a video asset based on a broadcast schedule, wherein the video asset includes video program segments and ad segments;
a network digital video recorder (nDVR) system coupled to the video broadcast system and configured to record the video asset to allow users to request the video using the nDVR system on demand;
a classifier coupled to receive user behavior information from user devices viewing the video asset using the nDVR system, the classifier configured for:
performing a content analysis of first audio, video, and/or text (AVT) features of the video asset to obtain a boundary that defines a first video segment and a second video segment;
performing a user behavior analysis of the user behavior information received from the user devices viewing the video asset using the nDVR system during the first video segment and the second video segment;
performing a content similarity analysis between second AVT features from the first video segment and third AVT features from the second video segment;
classifying the first video segment and the second video segment as either an ad segment or a video program segment based on the content analysis, the user behavior analysis, and the content similarity analysis; and
determining an action to be performed on the video asset based on the classifying of the first video segment and the second video segment.

* * * * *